FREQUENCY SHIFT RECEIVER WITH SINGLE DISCRIMINATOR
TUNED TO ONE SIDE OF BOTH SIGNAL FREQUENCIES

Filed April 9, 1965

EVERETT A. GILBERT and
GEORGE L. KING
INVENTORS

BY Rudolph J. Juick
ATTORNEY

United States Patent Office 3,440,541
Patented Apr. 22, 1969

3,440,541
FREQUENCY SHIFT RECEIVER WITH SINGLE DISCRIMINATOR TUNED TO ONE SIDE OF BOTH SIGNAL FREQUENCIES

Everett A. Gilbert, Denville, and George L. King, Morris Plains, N.J., assignors to RFL Industries, Inc., Boonton, N.J., a corporation of New Jersey Filed Apr. 9, 1965, Ser. No. 447,010
Int. Cl. H04b *1/18;* H04l *27/26, 17/16*
U.S. Cl. 325—320 2 Claims

ABSTRACT OF THE DISCLOSURE

A receiver providing a two state control function in correspondence with MARK and SPACE input signals comprised of pulses having different carrier frequencies. The receiver includes a single discriminator tuned to resonance at a frequency lying to one side of both of the input signal frequencies and provides two output voltages of different magnitudes, which voltages are rectified to control an output circuit.

Figures 1, 2:
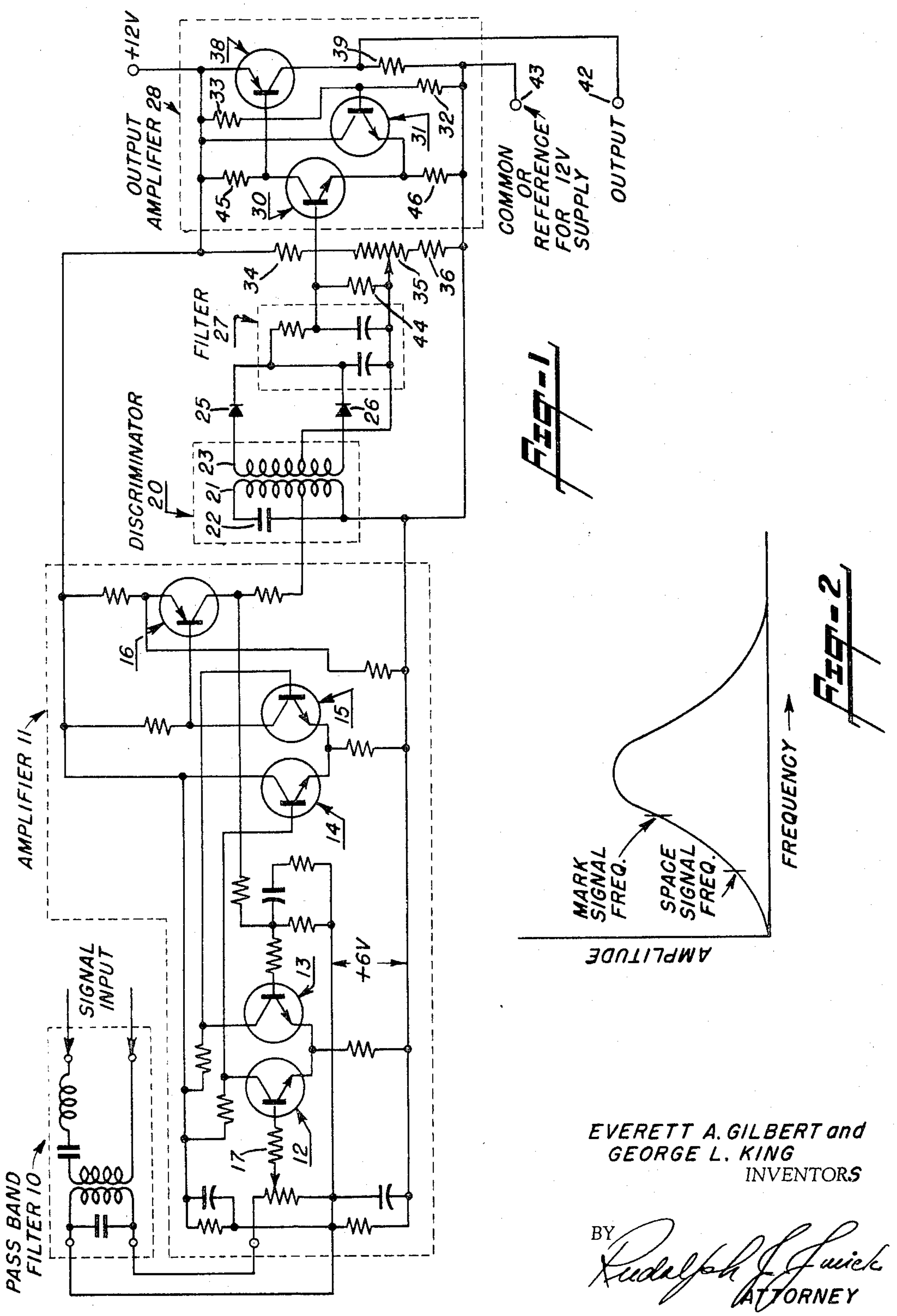

This invention relates to a receiver for use with apparatus which operates in response to a two-state input signal, the receiver output being one of two discrete states, or conditions, in correspondence with received signals of two different frequencies, or tones.

Data systems, telegraph, on-off control systems and telemetry operate with a binary code. Such code may consist of pulse position modulation or pulse duration modulation. In systems of this class, the code generator will cause two tones, or carrier frequencies, to be generated for transmission over a communication link to a remotely located receiver. It is common practice to designate these generated tones as MARK and SPACE tones. At the transmitter, the carrier frequency is shifted alternately from one discrete frequency to another in conformance with the code. This invention is directed to a simplified, frequency shift receiver for recovering the coded information from the frequency shifted carrier.

An object of this invention is the provision of a frequency shift receiver which will yield a two state output in accordance with the frequencies of received carrier signals, such output being in the form of voltage-no voltage, current-no current, or closed contact-open contact.

An object of this invention is the provision of a frequency shift receiver having a single tuned circuit discriminator for effecting a functional separation of received signals, thereby to actuate a two-state output circuit.

An object of this invention is the provision of a discriminator for deriving a two-state voltage output in correspondence with applied signals of two different frequencies, which voltage output is characterized by being of the same polarity but different finite amplitudes for each of the two states, and an output circuit controlled by said voltage output.

An object of this invention is the provision of apparatus for providing a two-state operation in correspondence with received carrier signals having two different frequencies, which apparatus comprises means amplifying and limiting the received signals and applying them to a discriminator tuned to resonance at a frequency spaced to one side of both signal frequencies, and an output circuit controlled by the output voltage of the discriminator.

These and other objects and advantages will become apparent from the following description when taken with the accompanying drawings. It will be understood, however, that the drawings are for purposes of illustration and are not to be construed as defining the scope or limits of the invention, reference being had for the latter purpose to the claims appended hereto.

In the drawings,

FIGURE 1 is a schematic circuit diagram of a receiver made in accordance with this invention; and FIGURE 2 is a frequency response curve of the discriminator.

Referring now to FIGURE 1, the incoming signals are applied to a band pass filter 10 having a band width corresponding to the similar filter in the output circuit of the remote transmitter. For purposes of illustration, it will be assumed that the MARK and SPACE signals have frequencies of 977 and 882 cycles per second, respectively. The received, filtered signals are applied to the receiver amplifier 11 comprising three direct coupled stages and having a high input impedance characteristic.

The amplifier 11 is of conventional design wherein the first stage comprises the emitter-coupled transistors 12 and 13 operating as a differential amplifier to provide a push-pull input to the second stage. Such second stage comprises the emitter-coupled transistors 14 and 15 providing a single-ended output signal to the third stage consisting of the transistor 16. A feedback network from the collector of the transistor 16 to the inverting input at the first stage provides both D.C. and A.C. stability to the amplifier. The signal from the band pass filter 10 is applied to the amplifier through a sensitivity control potentiometer 17. This signal appears at the collector of the transistor 16 in amplified and limited form.

The discriminator 20 is a parallel tuned circuit, consisting of the coil 21 and capacitor 22, which is resonant at a frequency somewhat above the MARK tone frequency, as shown in FIGURE 2. A constant current signal from the amplifier is applied to the discriminator and an output voltage is obtained from the center-tapped secondary winding 23. Such output voltage will have one constant amplitude when a MARK tone is received and another constant amplitude when a SPACE tone is received, the voltage corresponding to the MARK tone having the greater amplitude when the discriminator is tuned as described. For example, the output voltage generated in the secondary coil 23 will have a magnitude of 1.0 volt when a MARK tone signal is received, whereas such voltage will have a magnitude of 0.3 volt when a space tone signal is received. With no incoming signal, there will be no voltage generated in the secondary coil 23. The output voltages of the discriminator are applied to a full wave rectifier circuit, comprising the silicon diodes 25 and 26, and an RC filter network 27, to develop the D.C. voltage pulses for driving the output amplifier 28. These voltage pulses, which are of the same polarity and differ only in magnitude, appear across the resistor 44.

The output amplifier 28 is comprised of the transistors 30, 31 and 38. The transistors 30 and 31 are an emitter-coupled pair arranged in balanced configuration to minimize D.C. drift due to variations in the base-emitter voltage with temperature. The collector of the transistor 30, with the load resistor 45, is directly coupled to the base of the output stage transistor 38. In this arrangement, when the transistor 31 conducts, the transistors 30 and 38 are cut-off. When the transistor 30 conducts, the transistor 38 also conducts and the transistor 31 is cut-off. The base bias voltage for the transistor 31 is developed by the voltage divider resistors 32 and 33. The base bias voltage for the transistor 30 is obtained from the fixed, voltage divider resistors 34, 36 and the adjustable resistor 35. This voltage is applied to the base of the transistor 30 through the resistor 44. MARK and SPACE signal voltages from the discriminator, appearing across the resistor 44, are in series with this base bias voltage. Thus, a MARK signal will cause the output stage transistor to conduct to saturation, while a SPACE signal will cause the transistor 38 to remain cut-off.

The proper relationship for the base bias voltages between the transistors 30 and 31 are obtained as follows. With a carrier signal midway between the MARK and SPACE signal frequencies applied to the receiver, a D.C. voltage between the MARK and SPACE voltage levels is developed across the resistor 44. The adjustable resistor 35 is adjusted so that the base bias on the transistor 30 is equal to the fixed bias on the base of the transistor 31. The transistors 30 and 31 are then both in the active region of conduction. A SPACE voltage output from the discriminator, being lower in voltage, will cause the transistor 30 to conduct less and the transistor 31 to conduct more heavily due to its fixed base bias voltage. The effect of the common emitter-coupling resistor 46 is to cause the transistor 30 to be cut-off. Also, a zero signal condition will cause the transistor 30 to be cut-off. A MARK voltage output from the discriminator, being greater than the center-frequency voltage output, will reverse the conducting conditions of the transistors 30, 31 and 38.

The output voltage developed across the resistor 39 is an amplified and limited (square wave) version of the data pulses derived from the single, tuned circuit discriminator and the associated filter network. The resistor 35 can be adjusted so that the relative pulse length, or bias, of the discriminator output voltage can be made equal to that of the data pulses originating at the transmitter.

Obviously, the resistor 39 can be replaced by the operating coil of a D.C. relay if a contact output is required from the apparatus.

It can be seen that inversions of the two-state output with respect ot the received MARK and SPACE tones and no-signal condition, other than the relationship described hereinabove, can be obtained by minor circuit modifications. For example, the output stage transistor 38 could be driven by the transistor 31 and the discriminator circuit could be tuned to resonance below the SPACE signal frequency. Also, other output devices can be connected across the receiver output terminals 42, 43. The specific arrangement chosen will be dictated by the requirements of the code input circuit of the end device connected to the receiver.

In certain systems, it is highly desirable that the receiver output provide a definite non-conducting or conducting condition upon loss of the carrier signal. This normally requires additional components. However, this feature is obtained in the described receiver without need of additional components as the no-carrier signal condition corresponds to the low amplitude point on the discriminator response curve.

Having now described the invention, those skilled in this art will be able to make various changes and modifica-tions without thereby departing from the scope and spirit of the invention as set forth in the following claims.

We claim:

1. A frequency shift receiver responsive to MARK and SPACE input signals having two different frequencies comprising, (a) a limiter amplifier receiving the input signals and having an output circuit, (b) a discriminator having a single input coil connected to the amplifier output circuit and a center tapped output coil, said discriminator being tuned to resonance at a frequency to one side of both said MARK and SPACE signal frequencies, (c) first and second emitter-coupled transistors, (d) means applying a fixed base bias to the first transistor thereby placing the transistor in its active region of conduction, (e) means including a fixed resistor and an adjustable resistor applying a base bias to the second transistor, (f) a full wave rectifier network connected to the ends and center tap of the said output coil and applying D.C. voltages across the said fixed resistor, said D.C. voltages having the same polarity but different magnitudes in correspondence with MARK and SPACE signals applied to the discriminator, and (g) a normally non-conducting third transistor having its base connected to the collector of the said first transistor and a load connected in its output circuit; the recited arrangement being such that the third transistor conducts to saturation when one signal is received by the receiver and such transistor remains in non-conducting state when the other signal is received by the receiver.

2. The invention as recited in claim 1, wherein the MARK signal has a higher frequency than the SPACE signal, the discriminator is tuned to resonance at a frequency above that of the MARK signal, the said adjustable resistor is adjusted so that the base bias on the said second transistor is equal to that on the said first transistor when a center frequency signal is applied to the receiver, and wherein the said third transistor conducts to saturation only when a MARK signal is received by the receiver.

References Cited

UNITED STATES PATENTS

| | | | |
|---|---|---|---|
| 2,446,077 | 7/1948 | Crosby | 178—66 |
| 3,048,657 | 8/1962 | Buff | 178—66 X |

ROBERT L. GRIFFIN, *Primary Examiner.*

W. S. FROMMER, *Assistant Examiner.*

U.S. Cl. X.R.

178—66, 88